(12) United States Patent
Müller

(10) Patent No.: US 6,220,734 B1
(45) Date of Patent: Apr. 24, 2001

(54) ARRANGEMENT FOR ATTACHING A HEADLIGHT OR A LAMP TO A VEHICLE PART

(75) Inventor: Michael Müller, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/267,830

(22) Filed: Mar. 12, 1999

Related U.S. Application Data

(63) Continuation of application No. PCT/EP97/04592, filed on Aug. 22, 1997.

(30) Foreign Application Priority Data

Sep. 28, 1996 (DE) .............................. 196 40 096

(51) Int. Cl.⁷ ..................................... B60Q 1/00
(52) U.S. Cl. ........................... 362/520; 362/374; 362/549
(58) Field of Search .................... 362/495, 505, 362/506, 509, 520–522, 549, 374, 375, 433, 457

(56) References Cited

U.S. PATENT DOCUMENTS

| | | | |
|---|---|---|---|
| 2,177,968 | * 10/1939 | Weiss | 362/505 |
| 2,245,790 | * 6/1941 | Koubek et al. | 362/506 |
| 4,532,577 | 7/1985 | Shelton | 362/549 |
| 4,899,262 | * 2/1990 | Hammond et al. | 362/549 |
| 4,954,932 | 9/1990 | Isenga | 362/477 |
| 5,618,098 | * 4/1997 | Naganawa et al. | 362/549 |

FOREIGN PATENT DOCUMENTS

| | | |
|---|---|---|
| 2446207 | 9/1978 | (DE) . |
| 4323854 | 11/1994 | (DE) . |
| 4438491 | 2/1996 | (DE) . |
| 604306 | 6/1994 | (EP) . |
| 2683196 | 5/1993 | (FR) . |
| 2689945 | 10/1993 | (FR) . |
| 2729191 | 7/1996 | (FR) . |
| 2055421 | 3/1981 | (GB) . |

* cited by examiner

Primary Examiner—Alan Cariaso
(74) Attorney, Agent, or Firm—Baker Botts L.L.P.

(57) ABSTRACT

An arrangement for securing a headlight or a lamp including a housing and a lens as a single unit on a vehicle part has several fastening elements which are not covered by the lens. A cover member provided to cover the fastening elements is designed so that a substantially homogeneous appearance is given the cover and the lens to a person observing the lamp.

8 Claims, 5 Drawing Sheets

ARRANGEMENT FOR ATTACHING A HEADLIGHT OR A LAMP TO A VEHICLE PART

REFERENCE TO RELATED APPLICATION

This application is a continuation of International Application No. PCT/EP97/04592 filed Aug. 22, 1997.

BACKGROUND OF THE INVENTION

This invention relates to arrangements for attaching a headlight or a lamp, both referred to herein as a lamp, to a vehicle part in which the lamp includes a housing with a transparent cover, referred to herein as a lens, which is attachable as a structural unit to the vehicle part by fasteners which are not covered by the lens.

European Application No. 0 604 306 A1 discloses a lamp mount arrangement in which fastening devices for the housing are covered by the lens. In this arrangement, however, the housing is first attached to a vehicle part and then the lens is mounted on the housing. The fastening devices are not accessible without removing the lens.

German Patent No. 43 23 854 describes an adjusting device for a headlight which is located between a headlight and a blinker. The adjusting arrangement in this case is covered by the lens of the blinker.

Such covering of fasteners or adjusting devices is possible only if a second lamp abuts the lamp or the headlight. If a lamp or a headlight is fixed in a vehicle part without an adjacent lamp, that arrangement is not possible. Moreover, that arrangement requires a minimum gap width for introduction of an adjusting tool.

It is known in the prior art that a lamp fastening or adjusting arrangement may be covered with adjacent body parts or arranged on a rear housing wall of the lamp. Installation or actuation of such arrangements, however, is possible only if the lamp is adjacent to a removable or openable body part and accessibility is made possible by opening or removal of such a body part. If a lamp is located in the center of a body part, as for example on a fender, the fastening device cannot be covered by a hood, bumper, or the like. Furthermore, for reasons of design, it may be difficult to provide assembly-friendly access to the fastening device from the side of the fender facing the engine compartment.

It is also known that a lamp may be attached by one or more fastening devices, for example screws, which are accessible through the lens. In such arrangements, the fastening devices, in the absence of an additional covering, are recognizable when viewing the lamp from the front. Such arrangements are unacceptable in today's exacting aerodynamic and stylistic requirements.

SUMMARY OF THE INVENTION

Accordingly, it is an object of the present invention to provide an arrangement for attaching a lamp to a vehicle part which overcomes disadvantages of the prior art.

Another object of the invention is to provide an arrangement for mounting a lamp having a housing and a lens as a unit on a body part in which the attachment can be effected from the lens side of the unit.

A further object of the invention is to provide an arrangement for attaching a housing and a lens as a structural unit to a vehicle body while satisfying today's exacting stylistic and aerodynamic requirements.

These and other objects of the invention are attained by providing an arrangement for attaching a lamp to a vehicle body which includes a fastening element which is accessible through a lens and a cover for a fastening element which has an appearance similar to that of the lens.

Thus, according to the invention, it is possible to attach a lamp as a unit to a central region of a vehicle part from the outside. The cover for the fastening device has an appearance similar to that of the lens so that a substantially homogeneous general impression is conveyed to a viewer of the lamp.

For this purpose the cover may be made of the same material as the lens. Moreover, the homogeneous overall impression may be improved by conforming the color and/or contour of the cover to the color and/or contour of the lens.

To achieve good aerodynamics, the surface of the cover should be adapted to the adjacent surface of the lens to provide a continuous surface for the assembled cover and lens with no corners or edges.

Accessibility of the fastening element may be made possible by providing either an opening in the lens over the fastening element or a recess toward the edge of the lens, or a lens edge that does not extend to the edge of the lamp housing. The housing part with the fastening element that is not covered by the lens is then concealed by the cover. In this case, each fastening element may have a separate opening with a separate cover closing the opening. It is also possible, however, to provide a common opening for several fastening elements, and to cover several fastening elements with a single cover.

For example, a cover may be in the form of a circular annulus covering all of the fastening elements for the lamp.

Moreover, the fastening element may be molded directly to the cover.

BRIEF DESCRIPTION OF THE DRAWINGS

Further objects and advantages of the invention will be apparent from a reading of the following description in conjunction with the accompanying drawings, in which.

Figure 1:
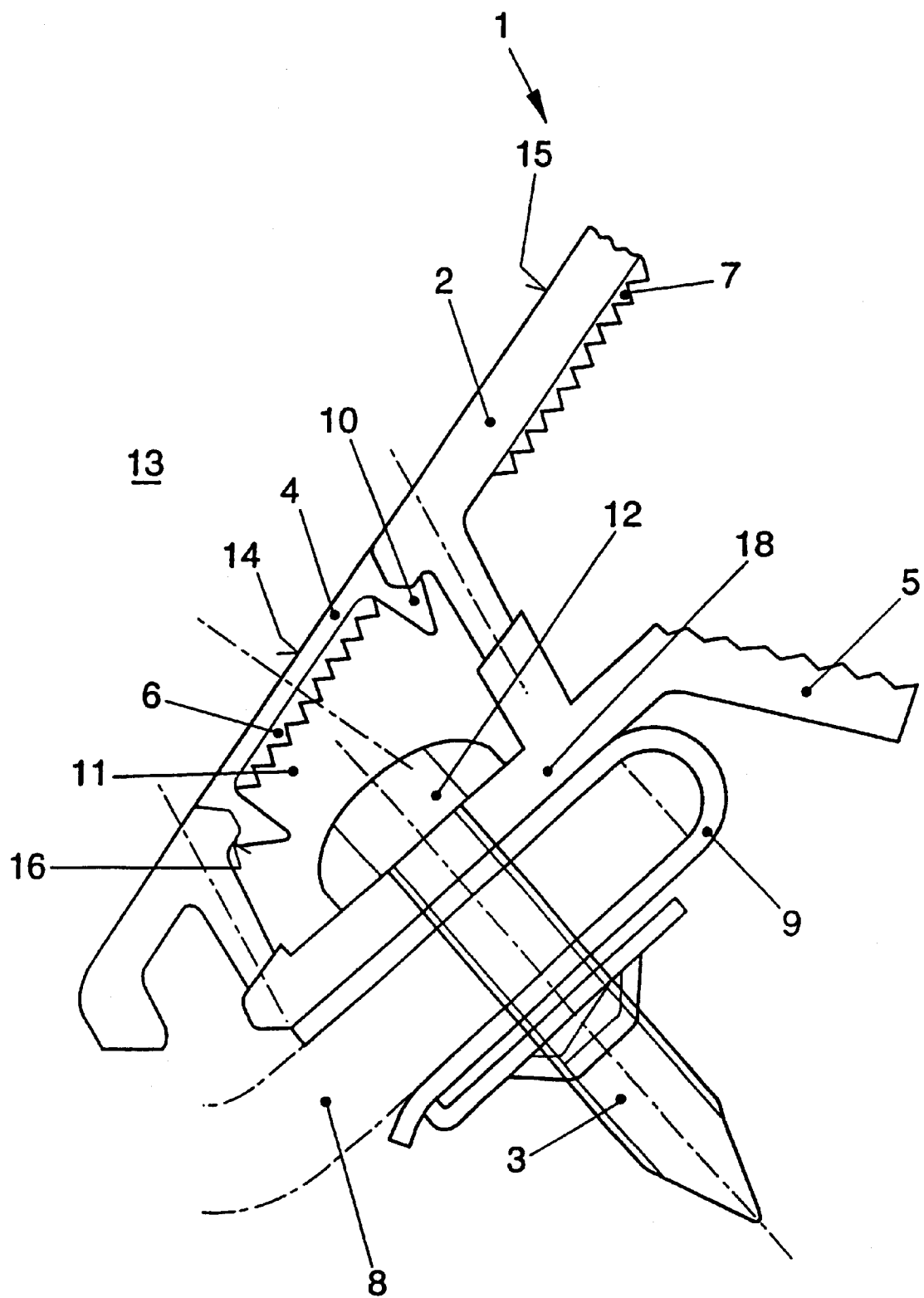
FIG. 1 is a schematic view showing a representative embodiment of a fastening arrangement for a lamp having a lens with an opening for a fastening element and a cover over the opening in accordance with the invention.

In the typical embodiment showing FIG. 1, a lamp unit 1 includes a housing 5 containing a light source and a transparent lens 2 which are attached as a subassembly unit to a vehicle part 8. For attachment of the lamp 1, the housing 5 includes one or more attachment portions 18 to which fastening elements 3 are applied to attach the housing 5 and the lens 2. The fastening elements 3 may, for example, be screws which are screwed to a receptacle 9 through openings in the attachment portions 18 and openings in corresponding vehicle parts 8.

The lens 2 for the lamp is formed with an opening 11 above each fastening element 3 through which the fastening element 3, for example a screw, is accessible from the lens side. The opening 11 may alternatively be a recess 17 of the type shown in FIG. 3a which extends to the edge of the housing 5. Moreover, several fastening elements 3 may be accessible through a common opening 11 or recess 17. After attachment of the lamp 1 to the vehicle parts 8 the openings 11 or recesses 17 are closed with a cover member 4. The cover member 4 may have a color and visual appearance corresponding to the color and visual appearance of the lens 2 and is preferably made of the same material as the lens. Further, the cover member 4 may have a surface contour 6 corresponding to the surface contour 7 of the lens 2. The surface 14 of the cover member 4 preferably conforms to the adjacent surface 15 of the lens 2, i.e. the outer surface 14 of the cover member has a configuration such that a substantially continuous surface contour extends over the two adjacent surface areas 14 and 15 of the cover member 4 and the lens 2.

The cover member 4 may, for example, be mounted in the openings 11 by integral projections 10 which are snapped behind corresponding projections 16 of the lens 2. For disassembly of the lamp 1, the cover member 4 may be freed in simple manner by prying it out of the opening or recess, for example, with a screwdriver.

Figure 2:
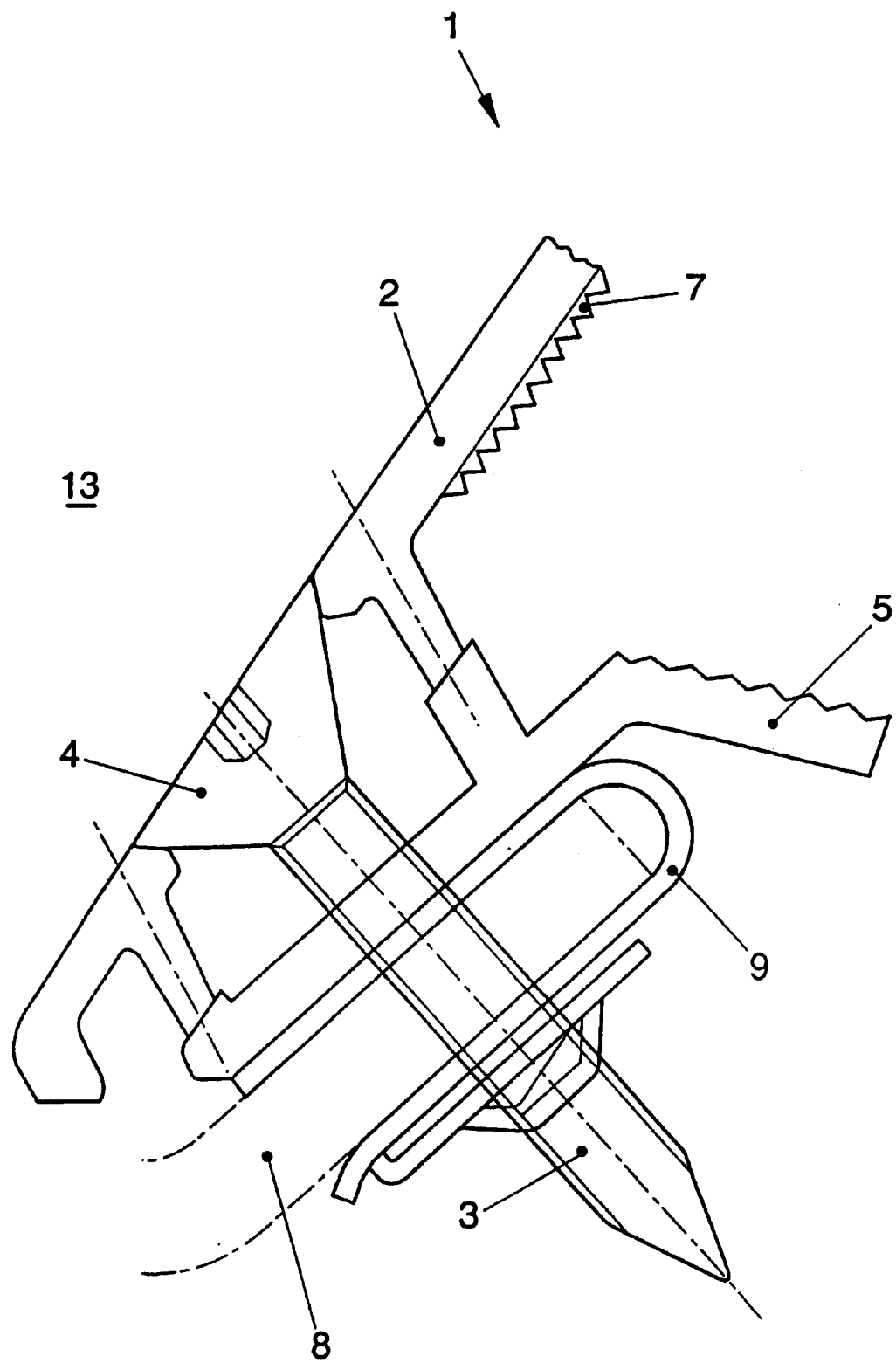
FIG. 2 is a view similar to FIG. 1 showing a fastening arrangement for a lamp including a screw and a screw head adapted to the lens for the lamp.

It is also possible, as shown in FIG. 2, to provide the cover member 4 directly on the fastening element 3.

Figure 3A:
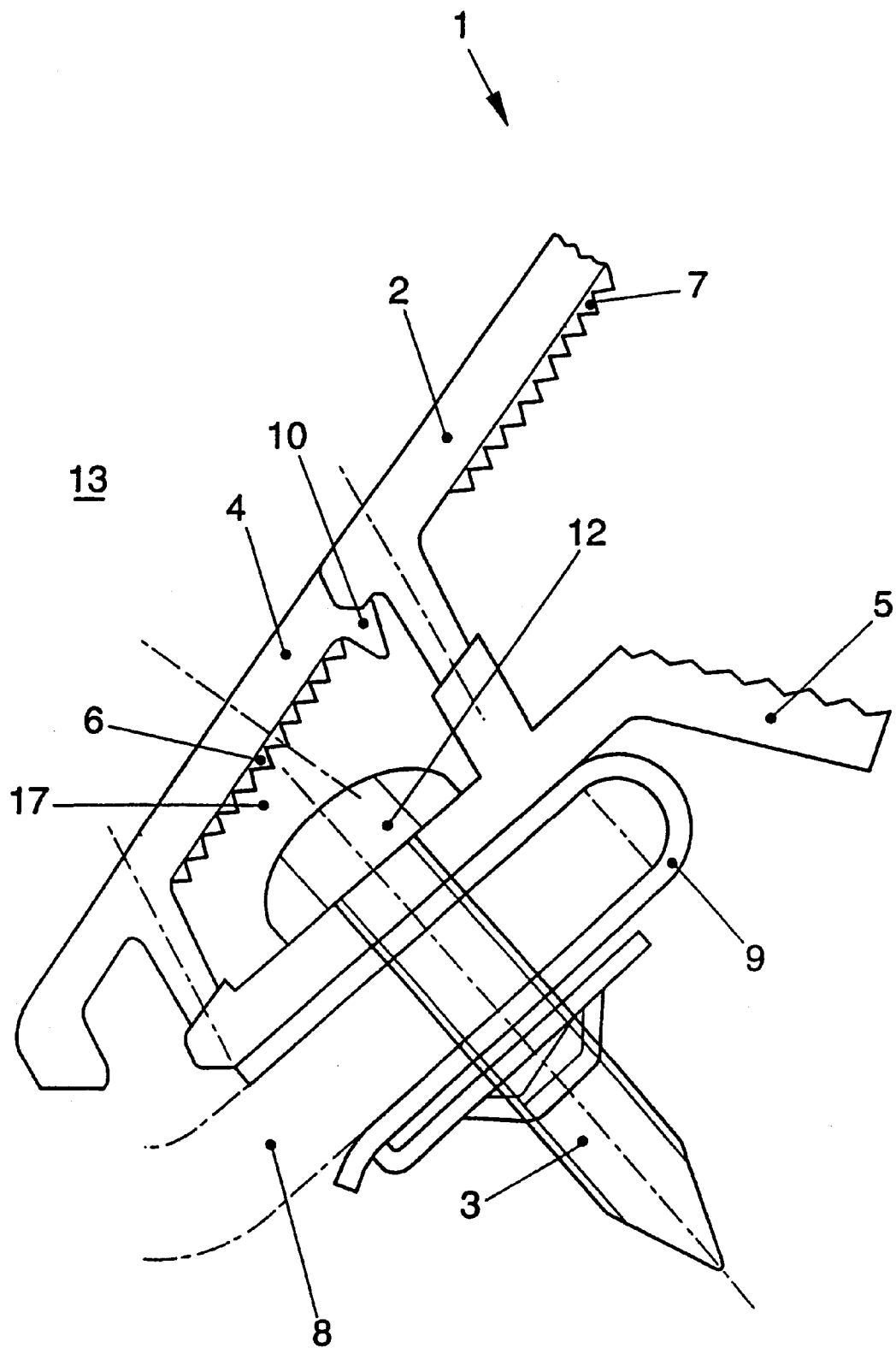
FIGS. 3a and 3b are similar views showing a fastening arrangement for a lamp having a recess over a fastening element.
Figure 3B:
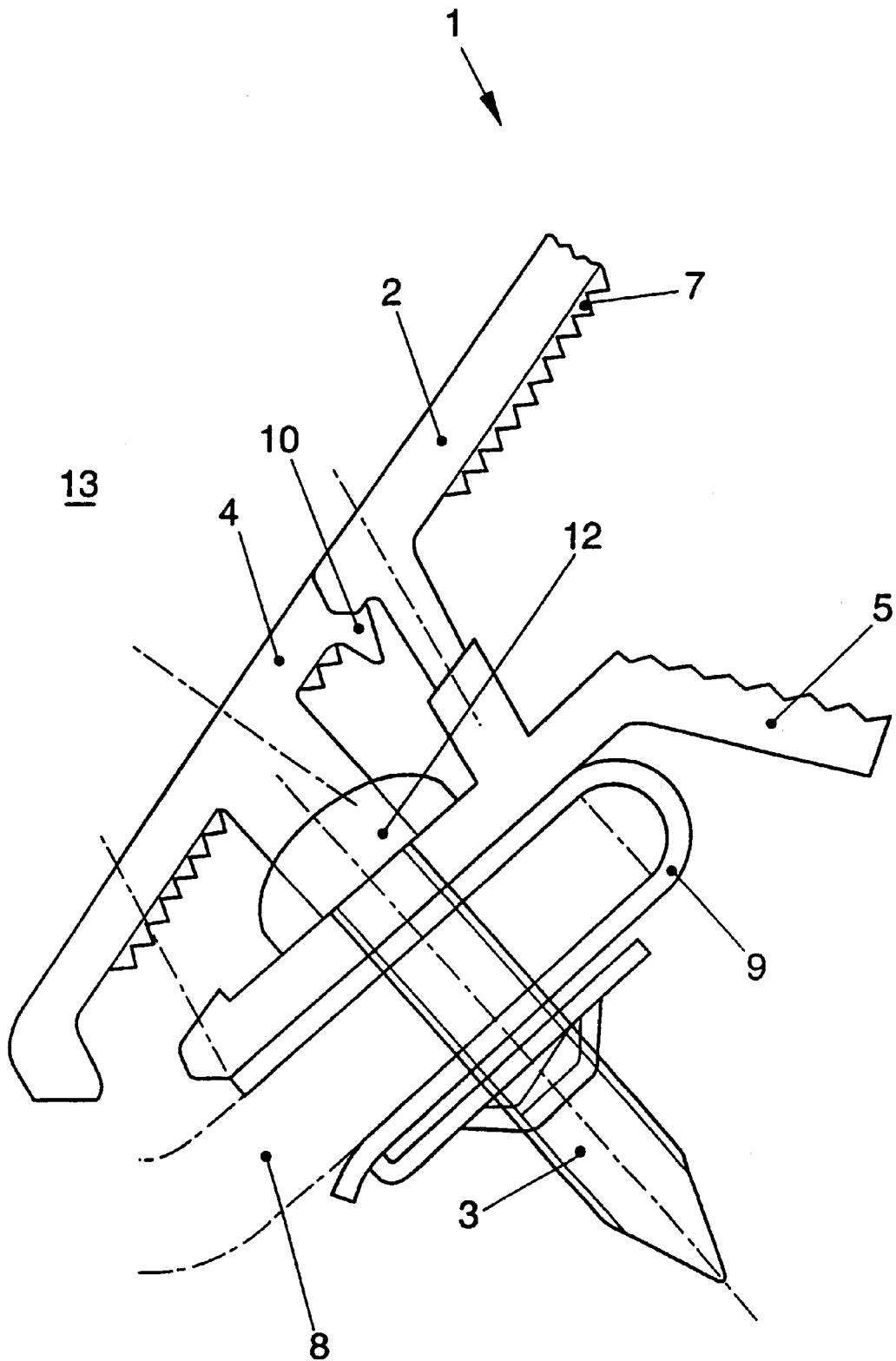
Figure 4:
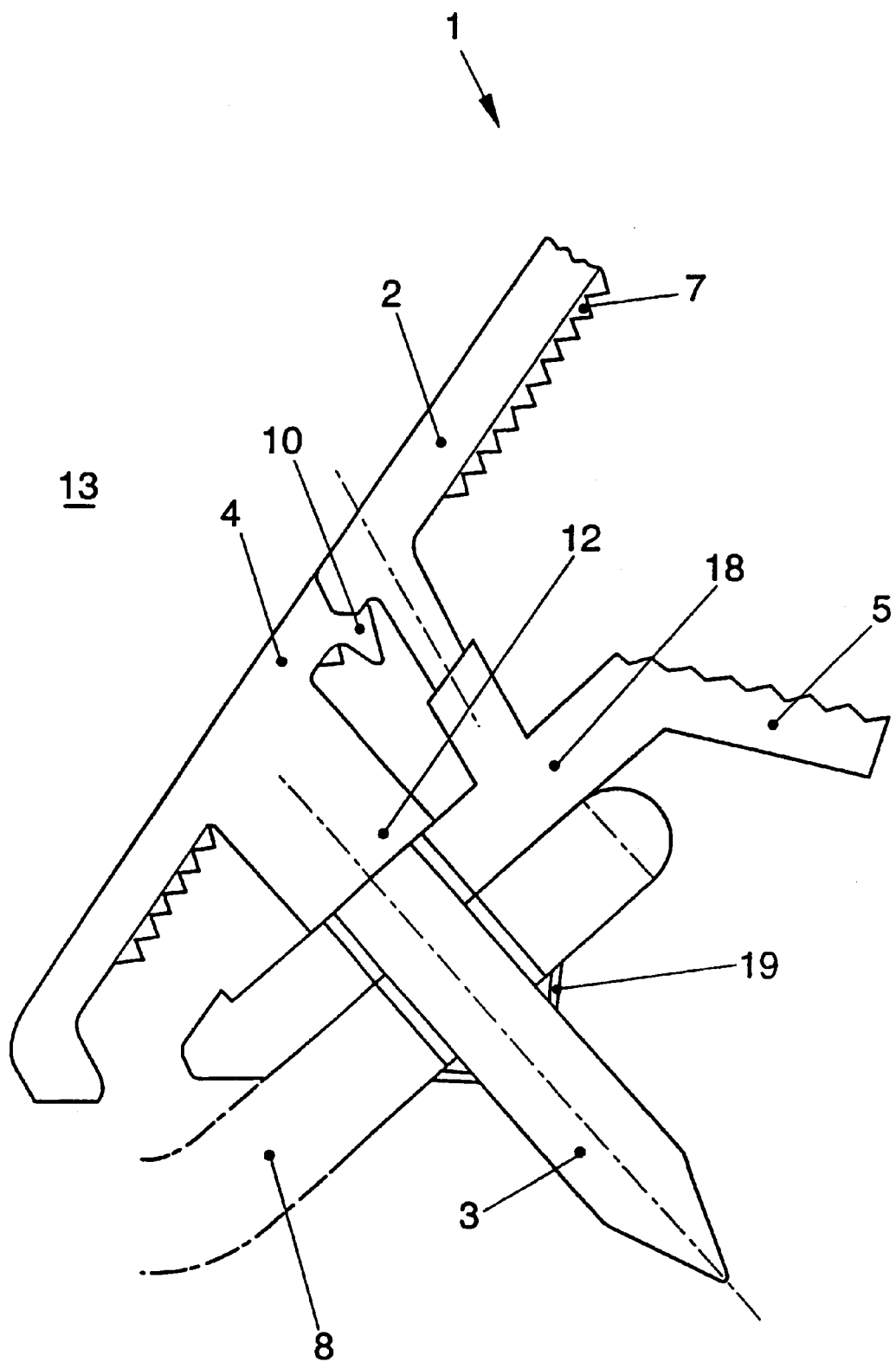
FIG. 4 is a view showing a fastening arrangement for a lamp with a cover over a recess and a fastening element molded on the cover.

If a recess 17 is provided for the fastening element 3, as shown in FIGS. 3a–4, then the cover member 4 may expediently be engaged, as shown in FIGS. 3a and 3b, on one side to the edge of the lens 2 and fastened either on the fastening element 3 or on the fastening portion 18 of the lamp.

It is also possible, as shown in FIG. 4, to mold the fastening element 3 onto the cover member 4 covering the recess, i.e. to make the fastening element 3 integral with the cover member 4. In this case the attachment can be secured by spring elements 19 since a screw connection is not feasible. The vehicle part 8 is then clamped between the attachment portion 18 and the spring elements 19, securing the lamp 1 to the vehicle part 8. Alternatively, several fastening elements 3 may be located in one opening 11 or recess 17 and covered by a common cover member 4. It is also possible to cover all fastening elements 3 with a single cover member having the configuration of a circular annulus, thus substantially simplifying assembly and disassembly.

Although the invention has been described herein with reference to specific embodiments, many modifications and variations therein will readily occur to those skilled in the art. Accordingly, all such variations and modifications are included within the intended scope of the invention.

I claim:

1. An arrangement for attaching a lamp to a vehicle part comprising:

a lamp having a housing and a lens forming a structural unit;

at least one fastening element which is not covered by the lens for attaching the structural unit to a vehicle part; and a cover member for covering the fastening element having a configuration with an edge portion conforming to an abutting edge portion of the lens such that a substantially homogeneous overall visual impression of the lamp is provided to a viewer of the surface of the lens.

2. An arrangement according to claim 1 wherein the lens and the cover member are made of the same material.

3. An arrangement according to claim 1 wherein a homogeneous overall visual impression is achieved by adapting the contour and/or color of the cover member at least locally to the contour and/or color of the lens.

4. An arrangement according to claim 1 wherein the cover member has a surface which conforms to the shape of the lens surface.

5. An arrangement according to claim 1 wherein the lens has at least one opening to receive at least one fastening element, the at least one opening being covered by the cover member.

6. An arrangement according to claim 5 wherein the cover member includes an engaging element and wherein the cover member can be retained on the lens by engagement of the engaging element behind a surface of the lens facing the housing.

7. An arrangement according to claim 1 wherein the lens includes a recess containing the fastening element which is covered by the cover member.

8. An arrangement according to claim 1 wherein the fastening element is made in one piece with the cover member.

* * * * *